United States Patent
Chiang et al.

(10) Patent No.: US 11,227,141 B2
(45) Date of Patent: Jan. 18, 2022

(54) FINGERPRINT IDENTIFICATION DEVICE AND FINGERPRINT IDENTIFICATION METHOD

(71) Applicant: Novatek Microelectronics Corp., Hsinchu (TW)

(72) Inventors: Shao-Yang Chiang, Hsinchu (TW); I-Hsiu Chen, Taipei (TW); Hung-Yu Yang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/850,015

(22) Filed: Apr. 16, 2020

(65) Prior Publication Data

US 2021/0004562 A1 Jan. 7, 2021

Related U.S. Application Data

(60) Provisional application No. 62/869,032, filed on Jul. 1, 2019.

(51) Int. Cl.
| | |
|---|---|
| G06K 9/00 | (2006.01) |
| G06F 3/042 | (2006.01) |
| G06F 3/041 | (2006.01) |

(52) U.S. Cl.
CPC ........ *G06K 9/00114* (2013.01); *G06F 3/0412* (2013.01); *G06F 3/0421* (2013.01); *G06K 9/0004* (2013.01); *G06K 9/00906* (2013.01)

(58) Field of Classification Search
CPC ............. G06K 9/00114; G06K 9/0004; G06K 9/00906; G06K 9/00107; G06F 3/0412; G06F 3/0421
See application file for complete search history.

(56) References Cited

U.S. PATENT DOCUMENTS

| 10,019,615 B2 | 7/2018 | Wu |
| 10,460,146 B2 | 10/2019 | Hung et al. |

(Continued)

FOREIGN PATENT DOCUMENTS

| CN | 109564626 | 4/2019 |
| CN | 109643379 | 4/2019 |

(Continued)

OTHER PUBLICATIONS

"Office Action of Taiwan Counterpart Application", dated Mar. 30, 2021, p. 1-p. 8.

*Primary Examiner* — Stephen G Sherman
(74) *Attorney, Agent, or Firm* — JCIPRNET (57) ABSTRACT

A fingerprint identification device and a fingerprint identification method are provided. The fingerprint identification device includes a self-emitting display panel, a fingerprint sensor and a processor. The self-emitting display panel displays at least one light pattern in a sensing region. The fingerprint sensor senses a finger object located above the sensing region of the self-emitting display panel to generate a first fingerprint image and a second fingerprint image corresponding to the at least one light pattern. The processor is coupled to the fingerprint sensor. The processor determines whether the first fingerprint image and the second fingerprint image have opposite tones to identify the finger object is a real finger or a fake finger.

24 Claims, 7 Drawing Sheets

(56) References Cited

U.S. PATENT DOCUMENTS

| | | | | |
|---|---|---|---|---|
| 2009/0161920 A1* | 6/2009 | Kan | ...................... | G06K 9/0004 |
| | | | | 382/115 |
| 2017/0109560 A1* | 4/2017 | Chen | ...................... | G06K 9/001 |
| 2017/0300738 A1* | 10/2017 | Li | ...................... | G06K 9/00087 |
| 2017/0364728 A1* | 12/2017 | Bachurinskii | ........ | G06K 9/0012 |
| 2018/0005031 A1* | 1/2018 | Chen | .................. | G06K 9/00087 |
| 2018/0018494 A1 | 1/2018 | Wu | | |
| 2018/0018496 A1 | 1/2018 | Hung et al. | | |
| 2018/0018500 A1 | 1/2018 | Wu | | |
| 2019/0362127 A1* | 11/2019 | Chien | .................. | G06K 9/0004 |
| 2020/0193120 A1* | 6/2020 | Chen | ...................... | H01L 27/323 |
| 2020/0387684 A1* | 12/2020 | Setlak | .................. | G06K 9/0008 |

FOREIGN PATENT DOCUMENTS

| | | |
|---|---|---|
| TW | I549065 | 9/2016 |
| TW | I609339 | 12/2017 |

\* cited by examiner

FINGERPRINT IDENTIFICATION DEVICE AND FINGERPRINT IDENTIFICATION METHOD

CROSS-REFERENCE TO RELATED APPLICATION

This application claims the priority benefit of U.S. provisional application Ser. No. 62/869,032, filed on Jul. 1, 2019. The entirety of the above-mentioned patent application is hereby incorporated by reference herein and made a part of this specification.

BACKGROUND

Technical Field

The disclosure relates to identification techniques, and particularly relates to a fingerprint identification device and a fingerprint identification method adapted to an under-display fingerprint sensing architecture.

Description of Related Art

In recent years, demands for fingerprint sensing have been gradually increased. In order to reduce a volume of a display apparatus, a fingerprint sensing region may overlap with a display region of the display apparatus. For example, an under-display fingerprint identification technique is to dispose/attach a fingerprint sensor beneath (on a back surface of) a display panel, and the fingerprint sensor may sense/capture a fingerprint image through the display panel. However, the conventional under-display fingerprint identification technique is unable to effectively identify differences between a real fingerprint and a fake fingerprint, such as a printed two-dimensional image or merely the fake finger having a flat fingerprint pattern. Therefore, solutions are provided in the following embodiments of the disclosure.

SUMMARY

The disclosure is directed to a fingerprint identification device and a fingerprint identification method, and are capable of identifying that the finger is a real or a fake one.

The fingerprint identification device of the disclosure includes a self-emitting display panel, a fingerprint sensor and a processor. The self-emitting display panel is configured to display at least one light pattern in a sensing region. The fingerprint sensor is configured to sense a finger object located above the sensing region of the self-emitting display panel to generate a first fingerprint image and a second fingerprint image corresponding to the at least one light pattern. The processor is coupled to the fingerprint sensor. The processor is configured to determine whether the first fingerprint image and the second fingerprint image have opposite tones to identify the finger object is a real finger or a fake finger.

The fingerprint identification method of the disclosure includes the following steps: displaying at least one light pattern in a sensing region of a self-emitting display panel; sensing a finger object located above the sensing region of the self-emitting display panel by a fingerprint sensor to generate a first fingerprint image and a second fingerprint image corresponding to the at least one light pattern; and determining whether the first fingerprint image and the second fingerprint image have opposite tones to identify the finger object is a real finger or a fake finger.

Based on the above, the fingerprint identification device and the fingerprint identification method of the disclosure can provide an effective fingerprint identification function by capturing two fingerprint images from the finger object and determining whether the two fingerprint images have opposite tones to effectively identify the finger object is a real finger or a fake finger.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
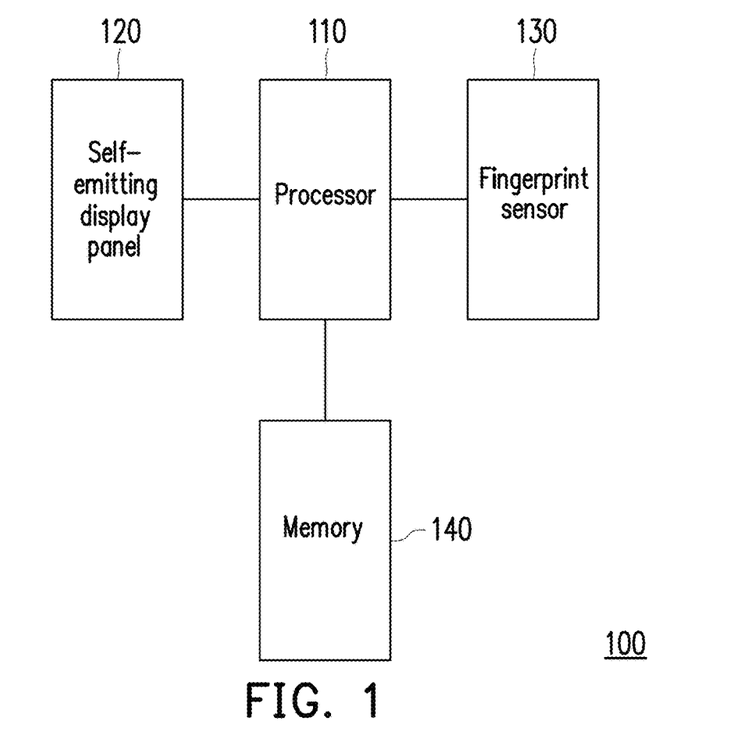
FIG. 1 is a block diagram illustrating a fingerprint identification device according to an embodiment of the disclosure.

FIG. 1 is a block diagram illustrating a fingerprint identification device according to an embodiment of the disclosure. Referring to FIG. 1, the fingerprint identification device 100 includes a processor 110, a self-emitting display panel 120, a fingerprint sensor 130 and a memory 140. The processor 110 is coupled to the self-emitting display panel 120, the fingerprint sensor 130 and the memory 140. In the embodiment, when the processor 110 determines that a finger object is replaced on the self-emitting display panel 120, the processor 110 operates the self-emitting display panel 120 to display at least one light pattern (or called light spot) for illuminating the finger object, where the at least one light pattern is displayed below the finger object. And then, the processor 110 drives the fingerprint sensor 130 to sense the finger object illuminated by the at least one light pattern to generate a first fingerprint image and a second fingerprint image. In the embodiment, the processor 110 may determines whether the first fingerprint image and the second fingerprint image have opposite tones to identify the finger object is a real finger or a fake finger. Therefore, the fingerprint identification device 100 is capable of effectively providing an anti-fake finger function.

In the embodiment, the processor 110 may be a graphics processing unit (GPU), an image signal processor (ISP), a central processing unit (CPU), another programmable general-purpose or specific-purpose microprocessor, digital signal processor (DSP), programmable controller, application specific integrated circuit (ASIC), programmable logic device (PLD), another similar processor, or a combination of the above processor circuits. The memory 140 may be a dynamic random-access memory (DRAM), a flash memory, or a non-volatile random-access memory (NVRAM), etc., but the disclosure is not limited thereto. The memory 140 may be configured to store a fingerprint identification program, image data captured by the fingerprint sensor 130, the image data that is temporarily stored during processing of the fingerprint identification program, etc., so that the processor 110 may perform the fingerprint identification function of the disclosure by access the memory 140.

In the embodiment, the self-emitting display panel 120 may be an organic light emitting diode (OLED) panel, but the disclosure is not limited thereto. The fingerprint sensor 130 may be an optical fingerprint sensor, and includes a CMOS image sensor (CIS). The fingerprint sensor 130 may disposed below the self-emitting display panel 120. In the embodiment, during a fingerprint identification period, the processor 110 may drivers the self-emitting display panel 120 to display the at least one light pattern for illuminating the finger object, and the fingerprint sensor 130 may sense the finger object illuminated the at least one light pattern through the self-emitting display panel 120.

Figure 2:
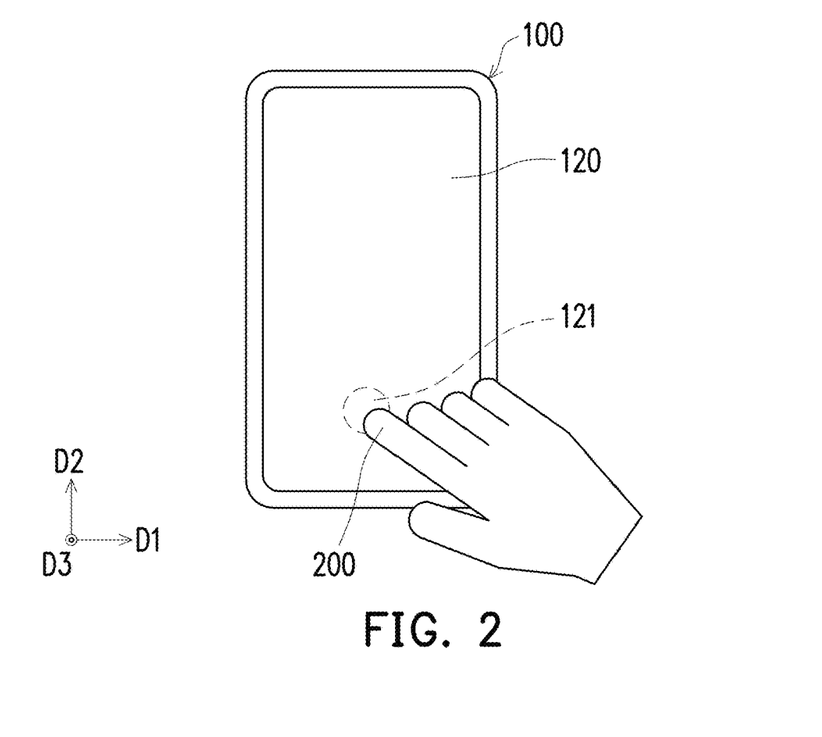
FIG. 2 is a top view diagram illustrating the fingerprint identification device according to the embodiment of the FIG. 1 the disclosure.

FIG. 2 is a top view diagram illustrating the fingerprint identification device according to the embodiment of FIG. 1 of the disclosure. Referring to FIG. 1 and FIG. 2, the fingerprint identification device 100 may be a mobile phone, and apply an under-display fingerprint sensing architecture. In the embodiment, the processor 110 and the memory 140 may be, for example, a processing circuit of the mobile phone, but the disclosure is not limited thereto. In one embodiment, the processor 110, the fingerprint sensor 130 and the memory 140 may be integrated into one fingerprint sensing chip. In the embodiment, the self-emitting display panel 120 may be parallel to a surface formed along a first direction D1 and a second direction D2, and a display/touch surface toward a third direction D3. The first direction D1, the second direction D2, and the third direction D3 are vertical to each other. For example, when the finger object 200 touches or place on a sensing region 121 of the self-emitting display panel 120, the self-emitting display panel 120 may provide respective touch data to the processor 110, so that the processor 110 may correspondingly drive the fingerprint sensor 130. The fingerprint sensor 130 is disposed below the sensing region 121 of the self-emitting display panel 120 to correspond to the finger object 200. The self-emitting display panel 120 may display at least one light pattern in the sensing region 121 to illuminate the finger object 200, and the fingerprint sensor 130 may sense the finger object 200 to generate the first fingerprint image and the second fingerprint image to processor 110 during the fingerprint identification period.

It should be noted that, in the embodiment, the self-emitting display panel 120 may provide at least two different illumination light for illuminating the finger object 200. The at least two different illumination light may include a first illumination light and a second illumination light, where the first illumination light may reflect by surface of the finger object 200 touching the self-emitting display panel 120, and the second illumination light may penetrate the finger object 200. In the embodiment, a first wavelength of the first illumination light is shorter than a second wavelength of the second illumination light. That is, the fingerprint sensor 130 may generate the first fingerprint image by sensing reflected lights provided by the finger object when the finger object receives the first illumination light from the at least one light pattern, and the fingerprint sensor 130 may generate the second fingerprint image by sensing diffused lights provided by the finger object when the finger object receives the second illumination light from the at least one light pattern.

Figure 3:
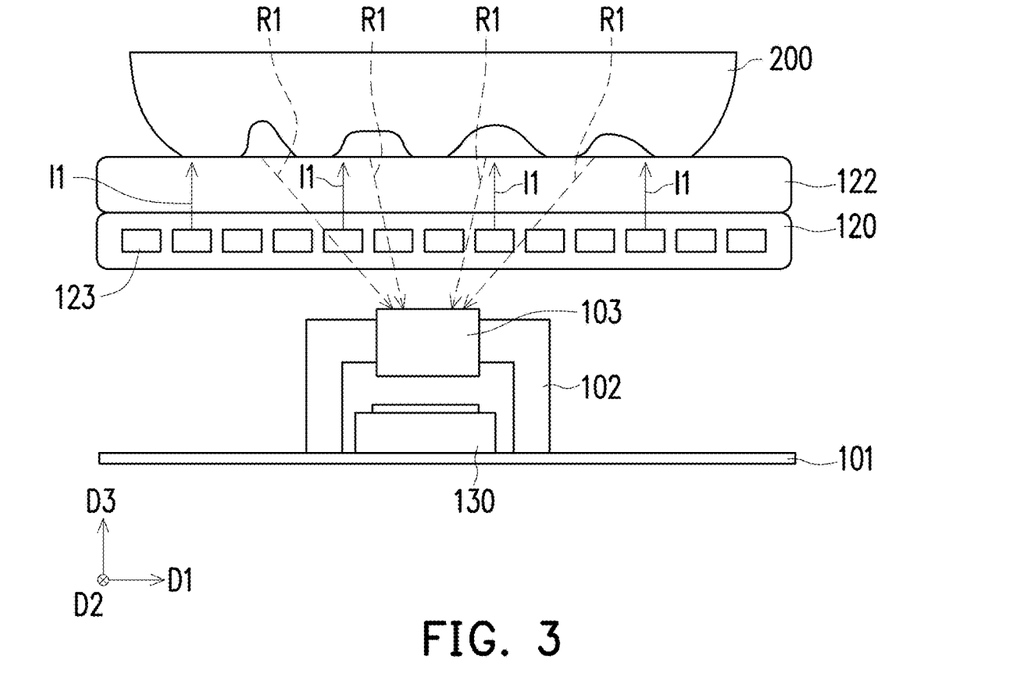
FIG. 3 is a schematic diagram illustrating a fingerprint sensor receiving a reflected light from a finger object according to an embodiment of the disclosure.

FIG. 3 is a schematic diagram illustrating a fingerprint sensor receiving reflected lights from a finger object according to an embodiment of the disclosure. Referring to FIG. 1 to FIG. 3, FIG. 3 illustrates a generating mechanism of the first fingerprint image of the disclose. In the embodiment, the fingerprint sensor 130 is disposed on a substrate 101, and a holder 102 is also disposed on the substrate 101 for holding a lens 103, where the holder 102 may be disposed to surround fingerprint sensor 130. The lens 103 may be a focusing lens, and a light guiding path of the lens 103 is corresponded to the fingerprint sensor 130 to collect image light from the finger object 200. A cover glass 122 may be disposed on the self-emitting display panel 120. The self-emitting display panel 120 includes a plurality of pixels 123, and the pixels 123 form a pixel array for display function. The pixels 123 may be, for example, a plurality of OLED sub-pixels, and the pixels 123 may include red pixels, green pixels and blue pixels. Moreover, in the embodiment, the self-emitting display panel 120 may further provide a touch function.

More specifically, during the fingerprint identification period, when the finger object 200 touches the cover glass 122 and locates above the sensing region 121 of the self-emitting display panel 120, the self-emitting display panel 120 may provide a touch coordinate data to the processor 110. Thus, the processor 110 drive the self-emitting display panel 120 according to the touch coordinate data. At least part of pixels 123 of the sensing region 121 of the self-emitting display panel 120 may be light up to display a corresponding light pattern in the sensing region 121, so that the sensing region 121 of the self-emitting display panel 120 may be correspondingly to provide first illumination lights I1 for illuminating the finger object 200. In one embodiment, due to the visible light with shorter wavelength is easier to be reflected on the surface of the finger object 200 touching the cover glass 122, the first illumination lights I1 may be a green light or a blue light, but the disclosure is not limited thereto. In the embodiment, the surface of the finger object 200 touching the cover glass 122 may reflect at least part of the first illumination lights I1 to provide the reflected lights R1 to the fingerprint sensor 130 through the lens 103. Therefore, the fingerprint sensor 130 may receive the reflected lights R1 having fingerprint information to generate a sensing image to the processor 110.

Figure 4:
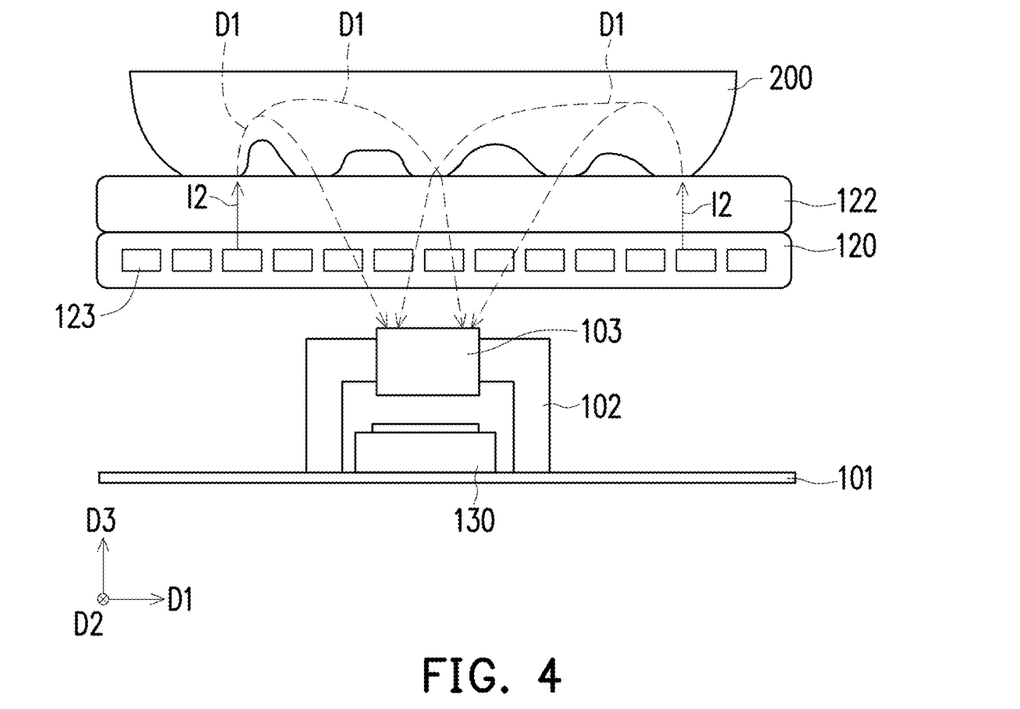
FIG. 4 is a schematic diagram illustrating a fingerprint sensor receiving a diffused light from a finger object according to an embodiment of the disclosure.

FIG. 4 is a schematic diagram illustrating a fingerprint sensor receiving a diffused light from a finger object according to an embodiment of the disclosure. Compared to the above embodiment of FIG. 3, in the embodiment, during the fingerprint identification period, when the finger object 200 touches the cover glass 122 and locates above the sensing region 121 of the self-emitting display panel 120, the processor 110 receives the touch coordinate data. Thus, the processor 110 drives the self-emitting display panel 120 according to the touch coordinate data. At least part of pixels 123 of the sensing region 121 of the self-emitting display panel 120 may be lighted up to display another corresponding light pattern in the sensing region 121, so that the sensing region 121 of the self-emitting display panel 120 may be correspondingly to provide second illumination lights 12 for illuminating the finger object 200. In one embodiment, due to the visible light with longer wavelength is easier to penetrate through the surface of the finger object 200 touched the cover glass 122, the second illumination lights 12 may be a red light, but the disclosure is not limited thereto. In the embodiment, at least part of the second illumination lights 12 may penetrate through the finger object 200 touching the cover glass 122, so that the second illumination lights 12 may be diffused inside the finger object 200. Thus, at least part of the second illumination lights 12 diffused inside the finger object 200 may penetrate through the finger object 200 touching the cover glass 122 again, and the diffused lights D1 may be guided to the fingerprint sensor 130 through the lens 103. Therefore, the fingerprint sensor 130 may receive the diffused lights D1 having fingerprint information to generate another sensing image to the processor 110.

Figure 5:
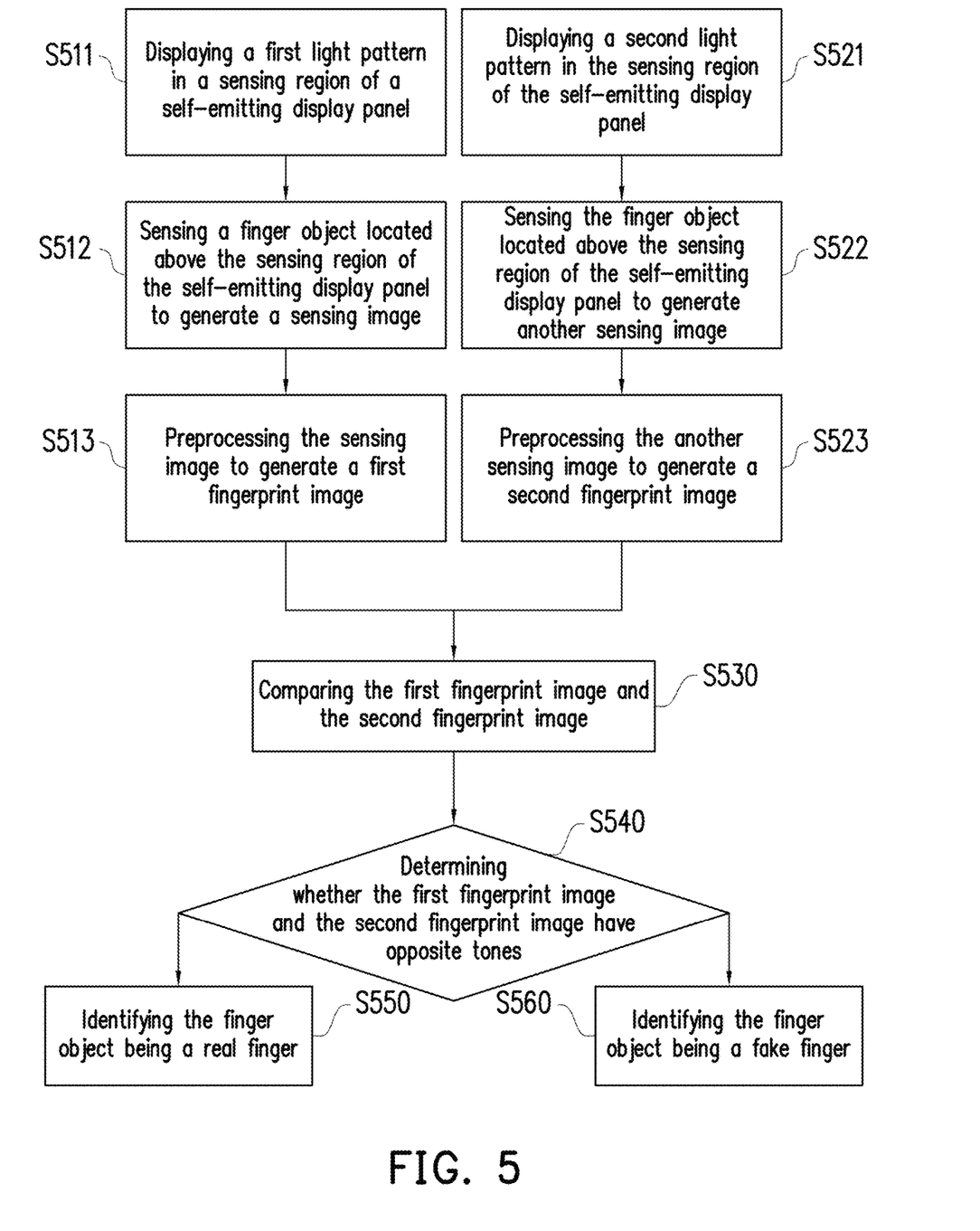
FIG. 5 is a flowchart of a fingerprint identification method according to an embodiment of the disclosure.
Figure 6A:
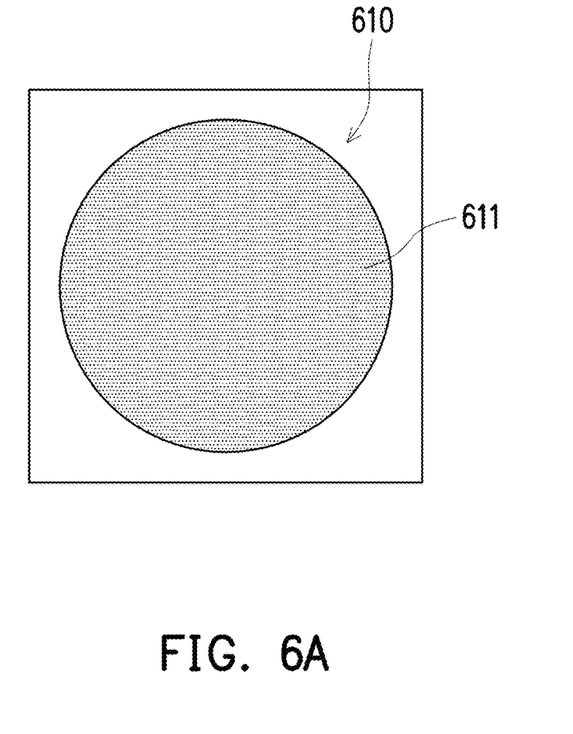
FIG. 6A is a schematic diagram illustrating a first light pattern according to an embodiment of the disclosure.

FIG. 5 is a flowchart of a fingerprint identification method according to an embodiment of the disclosure. Referring to FIG. 1, FIG. 2, FIG. 5, FIG. 6A to FIG. 7B, in the embodiment, when a finger object 200 touches the self-emitting display panel 120 and locates above the sensing region 121 of the self-emitting display panel 120, the fingerprint identification device 100 may execute the following steps S511 to S560 to display two different light patterns. In step S511, a first light pattern 610 of FIG. 6A is displayed in the sensing region 121 of the self-emitting display panel 120. FIG. 6A is a schematic diagram illustrating the first light pattern according to an embodiment of the disclosure. The first light pattern 610 includes a first pattern region 611. The first pattern region 611 has a specific color and may generate the first illumination lights. The first light pattern 610 of the self-emitting display panel 120 provides the first illumination lights to the finger object 200. In the embodiment, the first pattern region 611 may be a round shape, and towards the central of the finger object 200, so that the first illumination lights may illuminate to the central of the finger object 200, but the disclosure does not limit the shape of the first pattern region 611 nor pattern shape of the first light pattern 610. In step S512, the fingerprint sensor 130 senses the finger object 200 located above the sensing region of the self-emitting display panel 120 to generate a sensing image to the processor 110. In step S513, the processor 110 preprocesses the sensing image to generate a first fingerprint image 710 of FIG. 7A, where the processor 110 may be, for example, remove image noise of the sensing image. FIG. 7A is a schematic diagram illustrating the first fingerprint image according to an embodiment of the disclosure.

It should be noted that, in the embodiment, the first fingerprint image is generated by the fingerprint sensor 130 receiving reflected lights provided by the finger object 200. Referring to FIG. 3 again, if the finger object 200 is a real finger, due to the valley lines of the fingerprint of the finger object 200 do not touch the surface of the cover glass 122, at least part of the first illumination lights I1 are easily reflected by the locations of the cover glass 122 corresponding to the valley lines of the fingerprint of the finger object 200. On the contrary, at another part of the first illumination lights I1 are not easily reflected by the locations of the cover glass 122 corresponding to the ridge lines of the fingerprint of the finger object 200. Therefore, if the finger object 200 is a real finger, the image brightness of the fingerprint 711 (corresponding to ridge lines of the fingerprint) of the first fingerprint image 710 is darker than the non-fingerprint area 712 (corresponding to valley lines of the fingerprint) of the first fingerprint image 710.

Figure 6B:
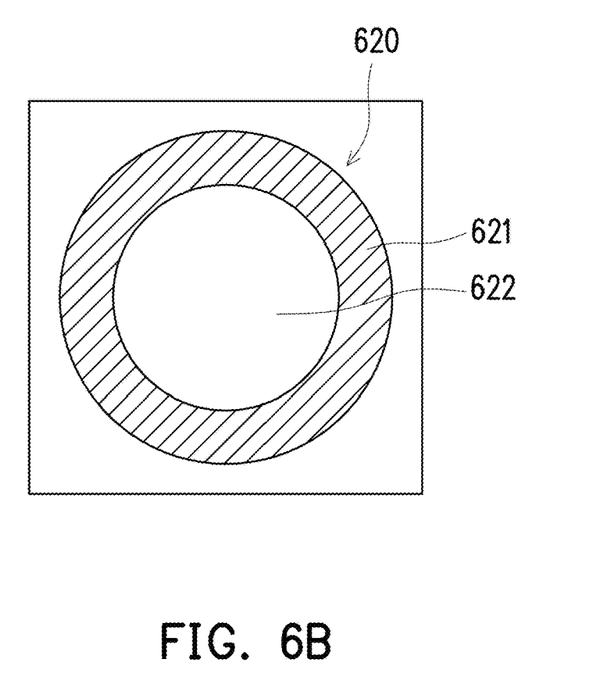
FIG. 6B is a schematic diagram illustrating a second light pattern according to an embodiment of the disclosure.
Figure 7A:
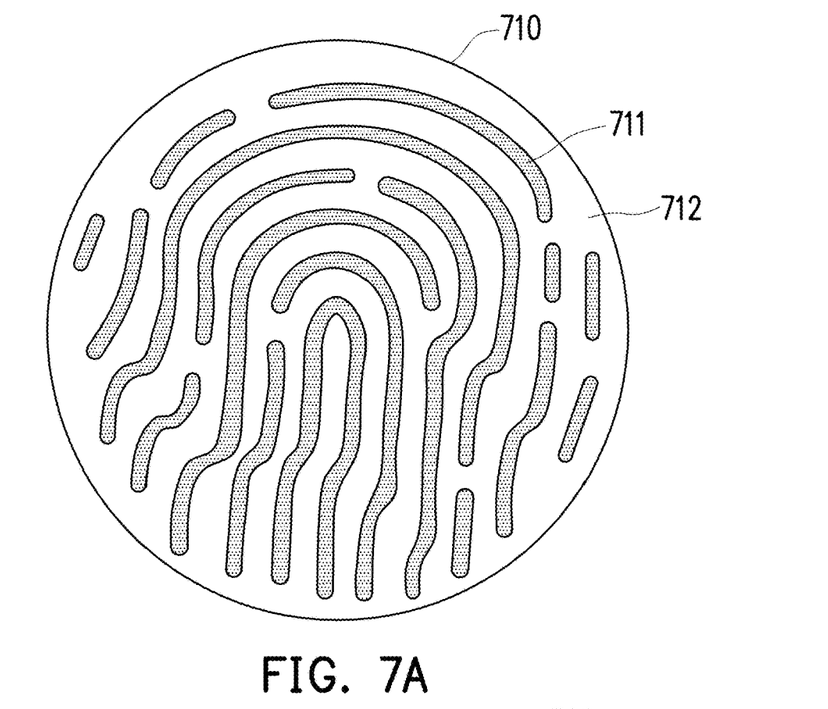
FIG. 7A is a schematic diagram illustrating a first fingerprint image according to an embodiment of the disclosure.
Figure 7B:
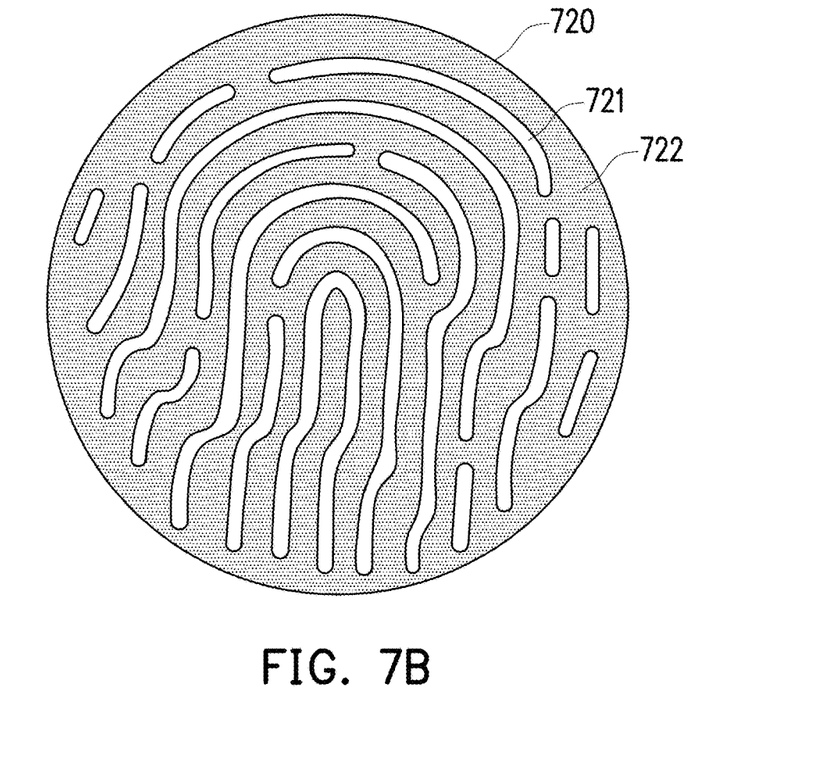
FIG. 7B is a schematic diagram illustrating a second fingerprint image according to an embodiment of the disclosure.

In step S521, a second light pattern 620 of FIG. 6B is displayed in the sensing region of the self-emitting display panel 120. FIG. 6B is a schematic diagram illustrating the second light pattern according to an embodiment of the disclosure. The second light pattern 620 includes a second pattern region 621. The second pattern region 621 has another specific color and may generate the second illumination lights. The second light pattern 620 of the self-emitting display panel 120 provides the second illumination lights to the finger object 200. In the embodiment, the second pattern region 621 may be a ring shape, so that the second illumination lights may penetrate through the edge of the finger object 200, but the disclosure does not limit the shape of the second pattern region 621 nor pattern shape of the second light pattern 620. In one embodiment, a first wavelength of the first illumination lights are shorter than a second wavelength of the second illumination lights. In step S512, the fingerprint sensor 130 sensing the finger object 200 located above the sensing region 121 of the self-emitting display panel 120 to provide another sensing image to the processor 110. In step S513, the processor 110 preprocesses the sensing image to generate a second fingerprint image 720 of FIG. 7B, where the processor 110 may be, for example, remove image noise of the sensing image. FIG. 7B is a schematic diagram illustrating the second fingerprint image according to an embodiment of the disclosure.

It should be noted that, in the embodiment, the second fingerprint image is generated by the fingerprint sensor 130 receiving diffused lights provided by the finger object 200. Referring to FIG. 4 again, if the finger object 200 is a real finger, due to the ridge lines of the fingerprint of the finger object 200 touch the surface of the cover glass 122, the second illumination lights 12 and the diffused lights D1 easily penetrate through the locations of the cover glass 122 corresponding to the ridge lines of the fingerprint of the finger object 200. On the contrary, the second illumination lights 12 do not easily penetrate through the locations of the cover glass 122 corresponding to the valley lines of the fingerprint of the finger object 200. Therefore, if the finger object 200 is a real finger, the image brightness of the fingerprint 721 (corresponding to ridge lines of the fingerprint) of the second fingerprint image 720 is brighter than the non-fingerprint area 722 (corresponding to valley lines of the fingerprint) of the second fingerprint image 720. More importantly, the disclosure does not limit the priority of steps S511 to S513 and steps S521 to S523. In one embodiment, the processor 110 firstly execute the steps S511 to S513, and then execute the steps S521 to S523.

Furthermore, if the finger object 200 is a fake finger, such as a printed two-dimensional image or merely the fake finger having a flat fingerprint pattern, due to the fake finger does not have the three-dimensional valley lines and ridge lines, the fingerprint sensor 130 cannot generate two different fingerprint images such as the first fingerprint image 710 and the second fingerprint image 720. Based on the above image characteristics of the first fingerprint image 710 and the second fingerprint image 720, in step S530, the processor 110 compares the first fingerprint image 710 and the second fingerprint image 720. For example, the processor 110 may compare grayscale values of each of pixels of the fingerprint image 710 and each of pixels of the second fingerprint image 720. In step S540, the processor 110 determines whether the first fingerprint image 710 and the second fingerprint image 720 have opposite tones. If the first fingerprint image 710 and the second fingerprint image 720 have the opposite tones, the processor 110 executes the step S550 to identify the finger object 200 being the real finger, and continuously performs subsequent fingerprint identification operations. If the first fingerprint image 710 and the second fingerprint image 720 do not have the opposite tones, the processor 110 executes the step S560 to identify the finger object 200 being the fake finger, and stops performing fingerprint identification operation.

In detail, the processor 110 may determine whether the tones of the fingerprint 711 of the first fingerprint image 710 is opposite to the tones of the fingerprint 721 of the second fingerprint image 720, and determine whether the tones of the non-fingerprint area 712 of the first fingerprint image 710 is opposite to the tones of the non-fingerprint area 722 of the second fingerprint image 720. However, in one embodiment, the processor 110 may determine whether a different value between the grayscale value of each of pixels of the first fingerprint image 710 and the grayscale value of each of pixels of the second fingerprint image 720 is greater than a threshold value, so as to identify the finger object 200.

In the embodiment, the fingerprint sensor 130 may sense the finger object 200 two times to capture the first fingerprint image 710 and the second fingerprint image 720 in sequence during the same fingerprint identification period. In addition, in one embodiment, the fingerprint sensor 130 includes a sensor array, and the sensor array may have first sensing units having first color filters and second sensing units having second color filters. Only the reflected lights can pass through the first color filters, and only diffused lights can pass through the second color filters. Thus, the first sensing units having the first color filters may receive the reflected lights to generate the first fingerprint image, and the second sensing units having the second color filters may receive the diffused lights to generate the second fingerprint image. In the embodiment, the first sensing units and the second sensing units operate image sensing non-simultaneously.

Figure 8:
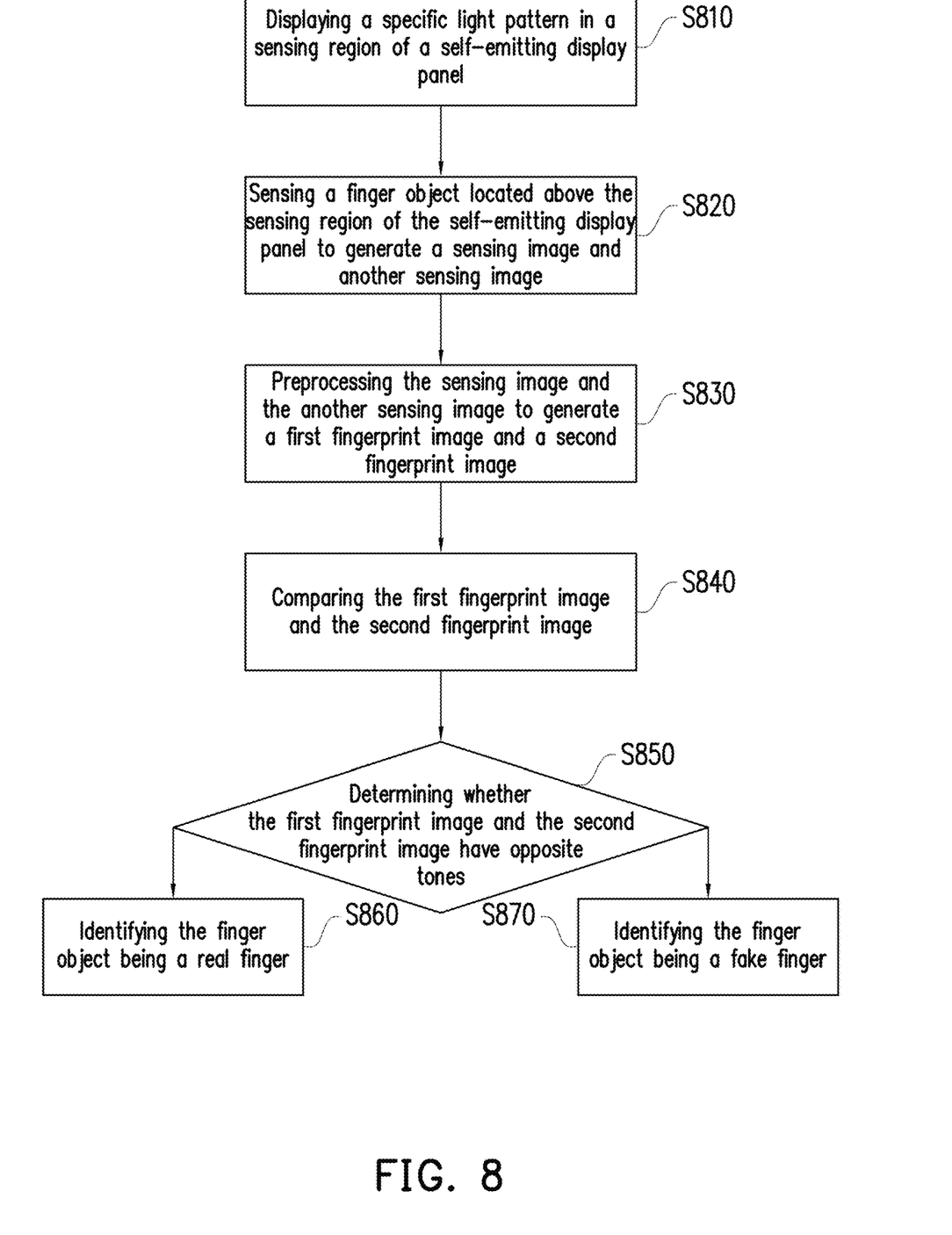
FIG. 8 is a flowchart of a fingerprint identification method according to another embodiment of the disclosure.
Figure 9:
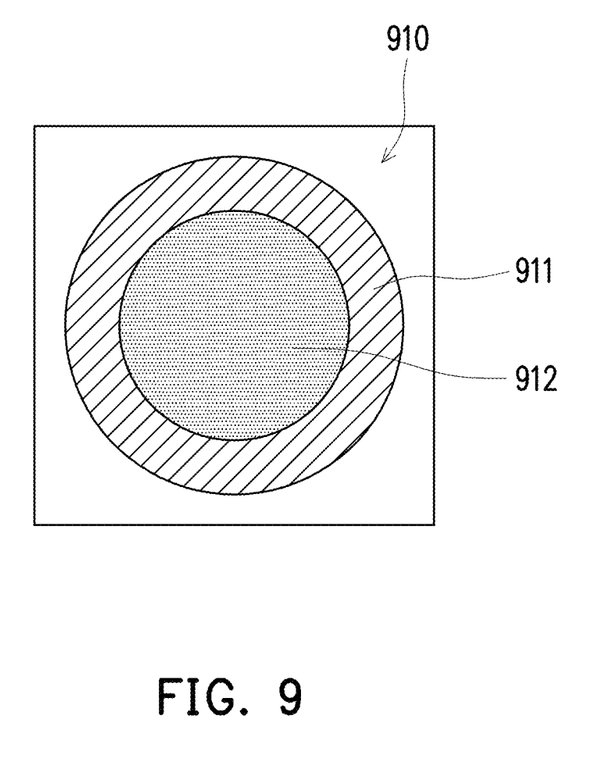
FIG. 9 is a schematic diagram illustrating a specific light pattern according to an embodiment of the disclosure.

FIG. 8 is a flowchart of a fingerprint identification method according to another embodiment of the disclosure. Referring to FIG. 1, FIG. 2, FIG. 7A to FIG. 9, in the embodiment, when a finger object 200 touches the self-emitting display panel 120 and locates above the sensing region 121 of the self-emitting display panel 120, the fingerprint identification device 100 may execute the following steps S810 to S870 to display one light pattern. In step S810, a specific light pattern 910 of FIG. 9 is displayed in sensing region of a self-emitting display panel 120. FIG. 9 is a schematic diagram illustrating a specific light pattern according to an embodiment of the disclosure. In one embodiment, the specific light pattern 910 has, for example, a mixed light pattern is generated by mixing the first light pattern 610 of FIG. 6A and the second light pattern 620 of FIG. 6B. In the embodiment, the specific light pattern 910 includes a first pattern region 911 and a second pattern region 912. The first pattern region 911 has the specific color and may generate the first illumination lights. The second pattern region 912 has the another specific color and may generate the second illumination lights. The second pattern region 912 surrounds the first pattern region 911, but the disclosure is not limited thereto. However, in one embodiment, the specific light pattern 910 may include the first pattern region 911 that occupies a part of entire pattern and second pattern region 912 that occupies another part of entire pattern. In the embodiment, the specific light pattern 910 of the self-emitting display panel 120 is capable of providing the first illumination lights and second illumination lights to the finger object 200 at the same time.

In the embodiment, the first pattern region 911 may be the round shape, and towards the central of the finger object 200, so that the first illumination lights may illuminate to the central of the finger object 200. The second pattern region 912 may be the ring shape, and located between the first pattern region 911 and the dark pattern region 913, so that the second illumination lights may penetrate through the edge of the finger object 200. The second pattern region 912 surrounds the first pattern region 911. However, the disclosure does not limit the shape of the first pattern region 911, shape of the second pattern region 912, nor pattern shape of the specific light pattern 910. In one embodiment, the first wavelength of the first illumination lights are shorter than the second wavelength of the second illumination lights. In step S820, the fingerprint sensor 130 sensing the finger object 200 located above the sensing region of the self-emitting display panel 120 to provide two sensing images to the processor 110. In step S830, the processor 110 preprocesses the two sensing images to generate the first fingerprint image 710 of FIG. 7A and the second fingerprint image 720 of FIG. 7B, where the processor 110 may be, for example, remove image noise of the sensing image. Compared with the embodiment of FIG. 5, in the embodiment, the fingerprint sensor 130 may sense the finger object 200 one or two times to capture the first fingerprint image 710 and the second fingerprint image 720 at the same time or in sequence during the same fingerprint identification period.

In step S840, the processor 110 compares the first fingerprint image 710 and the second fingerprint image 720. In step S850, the processor 110 determines whether the first fingerprint image 710 and the second fingerprint image 720 have opposite tones. If the first fingerprint image 710 and the second fingerprint image 720 have the opposite tones, the processor 110 executes the step S860 to identify the finger object 200 being the real finger, and continuously performs subsequent fingerprint identification operations. If the first fingerprint image 710 and the second fingerprint image 720 do not have the opposite tones, the processor 110 executes the step S870 to identify the finger object 200 being the fake finger, and stops performing fingerprint identification operation.

Moreover, in one embodiment, the fingerprint sensor 130 includes a sensor array, and the sensor array includes first sensing units having first color filters and second sensing units having second color filters. That is, the first sensing units having the first color filters may receive the reflected lights to generate the first fingerprint image, and the second sensing units having the second color filters may receive the diffused lights to generate the second fingerprint image. In the embodiment, the first sensing units and the second sensing units may operate image sensing simultaneously of non-simultaneously.

In summary, the fingerprint identification device and the fingerprint identification method of the disclosure are capable of providing an effective fingerprint identification function with an anti-fake finger effect. The fingerprint identification device of the disclosure provides two different color illumination lights for illuminating the finger object, and correspondingly captures two fingerprint images by sensing the reflected light and the diffused light of the finger object. Therefore, the fingerprint identification device of the disclosure is capable of determining the whether the two fingerprint images have opposite tones to effectively identify whether the finger object is the real finger or the fake finger. Moreover, the fingerprint identification device applied the fingerprint identification method of the disclosure also capable of effectively identify whether the finger object is the real finger or the fake finger.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint identification device, comprising:
    a self-emitting display panel, configured to display at least one light pattern in a sensing region;
    a fingerprint sensor, configured to sense a finger object located above the sensing region of the self-emitting display panel to generate a first fingerprint image and a second fingerprint image corresponding to the at least one light pattern; and
    a processor, coupled to the fingerprint sensor, and configured to determine whether the first fingerprint image and the second fingerprint image have opposite tones to identify the finger object being a real finger or a fake one,
    wherein the processor determines whether a difference between a grayscale value of each of pixels of the first fingerprint image and a grayscale value of each of corresponding pixels of the second fingerprint image is greater than a threshold, so as to determine whether the first fingerprint image and the second fingerprint image have opposite tones.

2. The fingerprint identification device as claimed in claim 1, wherein the fingerprint sensor generates the first fingerprint image by sensing a reflected light provided by the finger object when the finger object receives a first illumination light from the at least one light pattern, and the fingerprint sensor generates the second fingerprint image by sensing a diffused light provided by the finger object when the finger object receives a second illumination light from the at least one light pattern.

3. The fingerprint identification device as claimed in claim 2, wherein when the finger object is placed on the sensing region of the self-emitting display panel, the self-emitting display panel sequentially displays a first light pattern and a second light pattern,
    wherein the first light pattern of the self-emitting display panel provides the first illumination light to the finger object, so that the finger object provides the reflected light according to the first illumination light to the fingerprint sensor,
    wherein the second light pattern of the self-emitting display panel provides the second illumination light to the finger object, so that the finger object provides the diffused light according to the second illumination light to the fingerprint sensor.

4. The fingerprint identification device as claimed in claim 2, wherein when the finger object is placed on the sensing region of the self-emitting display panel, the self-emitting display panel displays one light pattern having a first pattern region and a second pattern region,
    wherein the first pattern region of the self-emitting display panel provides the first illumination light to the finger object, so that the finger object provides the reflected light according to the first illumination light to the fingerprint sensor,
    wherein the second pattern region of the self-emitting display panel provides the second illumination light to the finger object, so that the finger object provides the diffused light according to the second illumination light to the fingerprint sensor.

5. The fingerprint identification device as claimed in claim 4, wherein the second pattern region surrounds the first pattern region.

6. The fingerprint identification device as claimed in claim 4, wherein different sensing unit of the fingerprint sensor simultaneously senses the reflected light and the diffused light to generate the first fingerprint image and the second fingerprint image.

7. The fingerprint identification device as claimed in claim 4, wherein the fingerprint sensor non-simultaneously senses the reflected light and the diffused light to generate the first fingerprint image and the second fingerprint image.

8. The fingerprint identification device as claimed in claim 2, wherein a first wavelength of the first illumination light is shorter than a second wavelength of the second illumination light.

9. The fingerprint identification device as claimed in claim 2, wherein the fingerprint sensor comprises a sensor array, and the sensor array comprises a first sensing unit having a first color filter and a second sensing unit having a second color filter,
    wherein the first sensing unit having the first color filter is configured to receive the reflected light to generate the first fingerprint image, and the second sensing unit having the second color filter is configured to receive the diffused light to generate the second fingerprint image.

10. The fingerprint identification device as claimed in claim 2, further comprising:
    a lens, disposed between the self-emitting display panel and the fingerprint sensor,
    wherein the fingerprint sensor receives the reflected light and the diffused light provided by the finger object through the lens.

11. The fingerprint identification device as claimed in claim 1, wherein when the processor determines the first fingerprint image and the second fingerprint image having opposite tones according to image brightness, the processor identifies the finger object being the real finger, and when the processor determines the first fingerprint image and the second fingerprint image not having opposite tones according to the image brightness, the processor identifies the finger object being the fake finger.

12. The fingerprint identification device as claimed in claim 1, wherein the self-emitting display panel is an organic light emitting diode panel.

13. A fingerprint identification method, comprising:
- displaying at least one light pattern in a sensing region of a self-emitting display panel;
- sensing a finger object located above the sensing region of the self-emitting display panel by a fingerprint sensor to generate a first fingerprint image and a second fingerprint image corresponding to the at least one light pattern; and
- determining whether the first fingerprint image and the second fingerprint image have opposite tones to identify the finger object being a real finger or a fake one,
- wherein the step of determining whether the first fingerprint image and the second fingerprint image have opposite tones comprises: determining whether a difference between a grayscale value of each of pixels of the first fingerprint image and a grayscale value of each of corresponding pixels of the second fingerprint image is greater than a threshold.

14. The fingerprint identification method as claimed in claim 13, wherein the step of generating the first fingerprint image and the second fingerprint image comprises:
- generating the first fingerprint image by sensing a reflected light provided by the finger object when the finger object receives a first illumination light from the at least one light pattern; and
- generating the second fingerprint image by sensing a diffused light provided by the finger object by the fingerprint sensor when the finger object receives a second illumination light from the at least one light pattern.

15. The fingerprint identification method as claimed in claim 14, wherein the step of displaying at least one light pattern in the sensing region of the self-emitting display panel comprises:
- when the finger object is placed on the sensing region of the self-emitting display panel, sequentially displaying a first light pattern and a second light pattern by the self-emitting display panel,
- wherein the first light pattern of the self-emitting display panel provides the first illumination light to the finger object, so that the finger object provides the reflected light according to the first illumination light to the fingerprint sensor,
- wherein the second light pattern of the self-emitting display panel provides the second illumination light to the finger object, so that the finger object provides the diffused light according to the second illumination light to the fingerprint sensor.

16. The fingerprint identification method as claimed in claim 14, wherein the step of displaying at least one light pattern in the sensing region of the self-emitting display panel comprises:
- when the finger object is placed on the sensing region of the self-emitting display panel, displaying one light pattern having a first pattern region and a second pattern region by the self-emitting display panel,
- wherein the first pattern region of the self-emitting display panel provides the first illumination light to the finger object, so that the finger object provides the reflected light according to the first illumination light to the fingerprint sensor,
- wherein the second pattern region of the self-emitting display panel provides the second illumination light to the finger object, so that the finger object provides the diffused light according to the second illumination light to the fingerprint sensor.

17. The fingerprint identification method as claimed in claim 16, wherein the second pattern region surrounds the first pattern region.

18. The fingerprint identification method as claimed in claim 16, wherein different sensing unit of the fingerprint sensor simultaneously senses the reflected light and the diffused light to generate the first fingerprint image and the second fingerprint image.

19. The fingerprint identification method as claimed in claim 16, wherein the fingerprint sensor non-simultaneously senses the reflected light and the diffused light to generate the first fingerprint image and the second fingerprint image.

20. The fingerprint identification method as claimed in claim 14, wherein a first wavelength of the first illumination light is shorter than a second wavelength of the second illumination light.

21. The fingerprint identification method as claimed in claim 14, wherein the fingerprint sensor comprises a sensor array, and the sensor array comprises a first sensing unit having a first color filter and a second sensing unit having a second color filter,
- wherein the first sensing unit having the first color filter is configured to receive the reflected light to generate the first fingerprint image, and the second sensing unit having the second color filter is configured to receive the diffused light to generate the second fingerprint image.

22. The fingerprint identification method as claimed in claim 14, wherein a lens is disposed between the self-emitting display panel and the fingerprint sensor, so that the fingerprint sensor receives the reflected light and the diffused light provided by the finger object through the lens.

23. The fingerprint identification method as claimed in claim 13, wherein the step of determining whether the first fingerprint image and the second fingerprint image have the opposite tones to identify the finger object being the real finger or the fake one comprises:
- determining whether the first fingerprint image and the second fingerprint image have opposite tones according to image brightness;
- when the first fingerprint image and the second fingerprint image have opposite tones, identifying the finger object being the real finger; and
- when the first fingerprint image and the second fingerprint image do not have opposite tones, identifying the finger object being the fake finger.

24. The fingerprint identification method as claimed in claim 13, wherein the self-emitting display panel is an organic light emitting diode panel.

* * * * *